C. F. VOSS.
CORD FASTENER.
APPLICATION FILED APR. 15, 1920.
1,365,872. Patented Jan. 18, 1921.
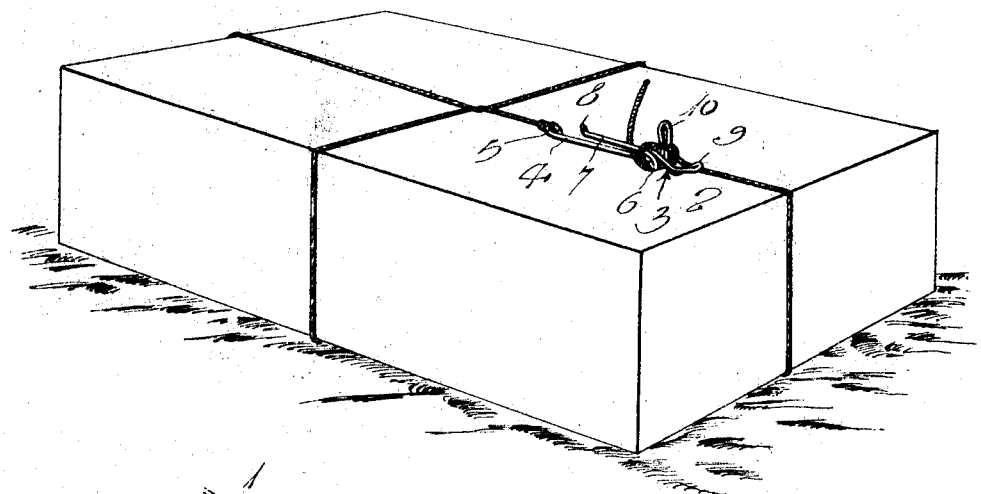
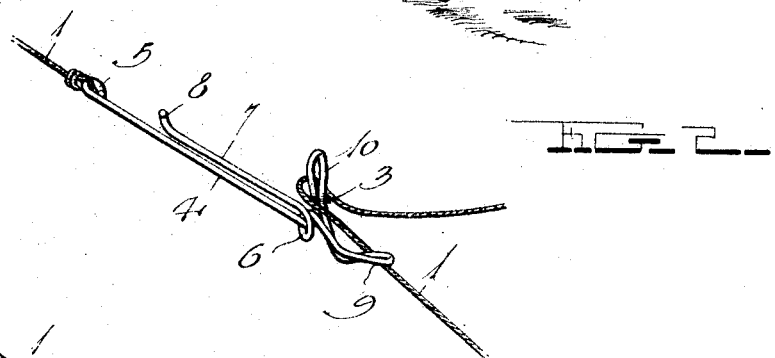
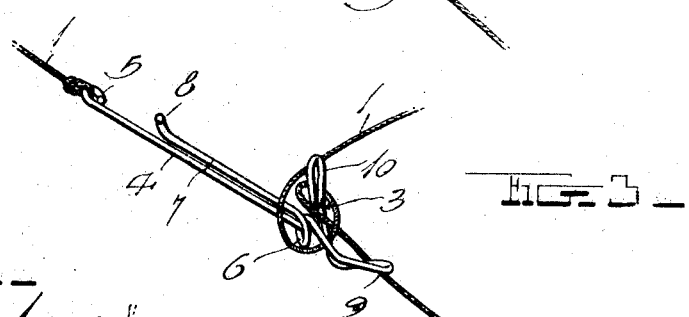
Witness:
H. Woodard
Inventor
Charles F. Voss
By H. B. Willson &co
Attorneys

UNITED STATES PATENT OFFICE.

CHARLES F. VOSS, OF NEW ORLEANS, LOUISIANA.

CORD-FASTENER.

1,365,872.  Specification of Letters Patent.  Patented Jan. 18, 1921.

Application filed April 15, 1920. Serial No. 374,152.

*To all whom it may concern:*

Be it known that I, CHARLES F. Voss, a citizen of the United States, residing at New Orleans, in the parish of Orleans and State of Louisiana, have invented certain new and useful Improvements in Cord-Fasteners; and I do declare the following to be a full, clear, and exact description of the invention, such as will enable others skilled in the art to which it appertains to make and use the same.

This invention relates to an improved cord fastener for use in connection with twine or cord used in bundle wrapping and one object of the invention is to provide a cord fastener so constructed that a cord may have one end connected with the shank portion of the fastener and the second end portion of the cord connected with the head portion of the fastener after the cord has been passed around a bundle, the cord then drawn tight and after being twisted about the head portion of the fastener gripped by a holding tongue extending longitudinally of the shank.

Another object of the invention is to so construct this cord fastener that it may be constructed from a strand of resilient wire bent to provide the head having the shank and cord gripping tongue extending therefrom.

Another object of the invention is to so construct this cord fastener that the cord when in place may engage the gripping tongue adjacent its inner end and thus assist in retaining the tongue in close contact with the shank.

This invention is illustrated in the accompanying drawings wherein:

Figure 1 is a perspective view of a box having a cord passed about the same and secured by the improved cord fastener.

Figs. 2, 3 and 4 are perspective views showing the different steps required for fastening a cord, the cord being shown loose instead of being drawn tight for the purpose of clearness in illustration.

This improved fastener is used for securing a cord 1 about a box or other packages 2 so that the securing cord may have its ends securely but releasably held and thus permit the securing cord to be readily released when desired. This will permit the cord to be removed from the package without being broken and will further permit it to be easily and quickly disconnected thus permitting ready access to the package. This fastener is formed from a strand of resilient wire which is bent at a point intermediate its length to provide a head 3. The extended arms or end portions of the wire are bent back upon the head toward each other and one end portion is bent to provide the shank 4 which terminates in an eye 5 in which one end of the cord 1 will be tied. The second end portion of the wire is wrapped about the shank 4 adjacent the head 3 as shown at 6 and the end portion then bent to extend along the shank to provide a cord gripping tongue 7 which has its free end bent out as shown at 8 for permitting the cord to be easily passed between the gripping tongue 7 and the shank. It will thus be seen that when completed the fastener consists of a shank having a cross head extending from one end with the shank positioned intermediate the length of the cross head and a gripping tongue extending longitudinally of the shank from the cross head. It will be further noted that the cross head extends diagonally of the shank and has one end portion 9 bent outwardly and has its opposite end portion 10 curved longitudinally or bent at a point intermediate its length so that its free end will extend upwardly.

When this fastener is in use the cord 1 has one end tied in the eye 5 and the cord is then passed about the package 2 in the usual manner as shown in Fig. 1. The fastener is then held in tight engagement with the package with one hand and the second end portion of the cord is then drawn toward the fastener and passed beneath the end portion 9 of the cross head 3 and hooked about the end portion 10 as shown in Fig. 2. The cord will then be drawn upon to tighten it about the package and will be passed under the end portion 9 of the cross head and over the shank and inner end portion of the gripping tongue 7 as shown in Fig. 3. The cord will then be drawn tight and if desired may be positioned to pass between the eye 6 and the cross head 3 although this is not necessary as it is desired in some instances to have the cord passed under the eye 6 and over the inner end portion of the gripping tongue, thus assisting in providing binding action. After the cord has been drawn tight it will be passed beneath the end portion 9 of the cross head and will then be drawn between the gripping tongue 7 and the shank 4 and will be securely held. It is of course obvious that the cord may be wound to extend beneath the end portions of the cross head and over the shank and inner portion of the gripping tongue as many times as desired before being passed beneath the gripping tongue. When it is desired to release the cord it is simply necessary to reverse the tying process, first passing the cord from beneath the gripping tongue and then unwinding it from engagement with the head. The package can then be opened and re-tied very easily and quickly and without it being necessary to break the cord or go to the trouble of untying a knot which may have been drawn tight.

What is claimed is:

1. A cord fastener formed from a strand of resilient wire bent with its end portions extending back upon an intermediate portion to provide a cross head, one end portion being bent to provide a shank extending from the cross head at a point intermediate the length thereof and terminating in a cord receiving eye, the second end portion of the wire being coiled about the end portion of the shank adjacent the cross head and then bent to provide a cord gripping shank extending longitudinally of the shank, the cross head extending diagonally of the shank and having one end portion bent intermediate its length for extending outwardly, and the second end portion being bent for extending upwardly from a point adjacent the shank.

2. A cord fastener formed from a strand of resilient wire bent back upon its intermediate section to provide a cross head, one end portion of the wire being then bent to provide a shank extending from the cross head and terminating in a cord engaging element, the second end portion of the wire being coiled about the shank adjacent the cross head and then bent to provide a cord gripping tongue extending longitudinally of the shank.

3. A cord fastening device formed from a strand of resilient wire bent to provide a cross head, a shank for connection with a cord, and a cord gripping tongue extending from the cross head longitudinally of the shank, the cross head extending diagonally of the shank and having one end portion bent at a point intermediate the shank and its free end to extend its free end portion across the line of the shank, the second end portion of the shank being bent to extend upwardly for looped engagement by a cord passed under the free end of the first mentioned end portion of the head.

4. A cord fastener comprising a cross head, a shank extending from the cross head and having a cord engaging element, and a resilient strand extending from the cross head and coiled about the shank adjacent the cross head and then bent to provide a cord gripping tongue extending longitudinally of the shank.

In testimony whereof I have hereunto set my hand.

CHARLES F. VOSS.